(12) United States Patent
Hudrick et al.

(10) Patent No.: US 6,637,655 B1
(45) Date of Patent: *Oct. 28, 2003

(54) AUTOMATIC RANGE ADJUSTMENT TECHNIQUES FOR STAND-MOUNTABLE BAR CODE SCANNERS

(75) Inventors: Donald T. Hudrick, Sicklerville, NJ (US); David M. Wilz, Sr., Sewell, NJ (US); Garrett K. Russell, Wilmington, DE (US); George B. Rockstein, Audubon, NJ (US); Mark S. Schmidt, Williamstown, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 124 days.

This patent is subject to a terminal disclaimer.

(21) Appl. No.: 09/589,853

(22) Filed: Jun. 8, 2000

(51) Int. Cl.⁷ ................................................. G06K 7/10
(52) U.S. Cl. .............................. 235/462.14; 235/462.31
(58) Field of Search ...................... 235/462.14, 462.22, 235/462.23, 462.25, 462.31, 472.01

(56) References Cited

U.S. PATENT DOCUMENTS

| | | | |
|---|---|---|---|
| 4,317,992 A | | 3/1982 | Stauffer |
| 4,920,255 A | | 4/1990 | Gabeler |
| 5,308,960 A | * | 5/1994 | Smith et al. ................. 235/454 |
| 5,340,971 A | | 8/1994 | Rockstein et al. |
| 5,406,063 A | * | 4/1995 | Jelen ..................... 235/472.01 |
| 5,426,288 A | * | 6/1995 | Obata et al. ........... 235/462.01 |
| 5,483,051 A | * | 1/1996 | Marchi .................. 235/462.01 |
| 5,525,789 A | | 6/1996 | Rockstein et al. |
| 5,528,024 A | | 6/1996 | Rockstein et al. |
| 5,536,926 A | | 7/1996 | Ikeda et al. |
| 5,673,136 A | | 9/1997 | Inoue et al. |
| 5,679,941 A | * | 10/1997 | Iizaka et al. ................ 235/383 |
| 5,751,463 A | | 5/1998 | Inoue et al. |
| 5,789,730 A | | 8/1998 | Rockstein et al. |
| 5,837,989 A | | 11/1998 | Rockstein et al. |
| 5,877,883 A | | 3/1999 | Inoue et al. |
| 5,886,337 A | | 3/1999 | Rockstein et al. |
| 5,933,242 A | | 8/1999 | Blümcke et al. |
| 6,049,406 A | | 4/2000 | Zocca |
| 6,053,409 A | * | 4/2000 | Brobst .................... 235/462.36 |
| 6,182,898 B1 | * | 2/2001 | Schmidt et al. ........ 235/462.45 |
| 6,325,289 B1 | * | 12/2001 | Mazzone ................ 235/462.14 |
| 6,412,700 B1 | * | 7/2002 | Blake et al. ........... 235/472.01 |

\* cited by examiner

*Primary Examiner*—Daniel St. Cyr
(74) *Attorney, Agent, or Firm*—Morgan, Lewis & Bockius LLP

(57) ABSTRACT

By automatically adjusting the object detection mechanism of a bar code scanner from a long range mode of operation to a short range mode of operation, the scanner will remain capable of detecting and decoding bar codes even if the object detection mechanism repeatedly detects the presence of a background object. The techniques of the present invention commence when the bar code scanner is placed in a position such that the scanner's object detection mechanism repeatedly detects a background object such as a counter top or conveyer belt. The object detection mechanism is set to the long range mode of operation if it is not already so set. In the case of a stand-mounted scanner, a test is performed to ascertain whether or not the scanner is in its stand, and the method will only proceed once the scanner is resting in the stand. Next, the scanner is programmed to wait for a predetermined amount of time, after which the operational mode of the object detection mechanism is changed from the long range mode to the short range mode. At this time, the object detection mechanism no longer detects the presence of the background object. The scanner will now detect any new objects that enter the field of view of the object detection mechanism, and attempt to read any bar codes which may be present

12 Claims, 7 Drawing Sheets

METROLOGIC AUTOMATIC SHORT RANGE ADJUSTMENT
THE BOLD AREA IN THE CODE INDICATES THE EXACT AREA IN WHICH THE RANGE
IS CHECKED AND CHANGED.
;**** OBJECT HAS REMAINED IN THE FIELD, WAIT UNTIL IT HAS GONE
;       IR-PROX HAS REMAINED ACTIVE.
;
;
```
ENV:    MOV.B #H'0:8,R4L
        MOV.B R4L,@TIMIT
        MOV.B R4L,@FIFTY
        BCLR  TOLONG
        JSR              @SET_IR      ;SETUP IR DETECTION PORT
PIN
;
ENVE ; JSR              @CKCOMM      ;CHECK FOR COMMAND REQUESTS
;
        BCLR  MOTRUN                 ;ENABLE DE-ACTIVATE OF MOTOR
        JSR              @LEDOFF
;
        MOV.B @NOVRAM+183,R4L        ;NOVRAM+183,LASER &LED OPERAT-
ING MODES
        AND              #H'F0,R4L
        CMP.B #H'30,R4L
        BNE              GOENVE       ;BRANCH IF NOT CONTINUOUS BLINKY
;
        MOV.B #H'0:8,R4L
        MOV.B R4L,@NOSCAN            ;REINITIALIZE THE COUNTER
        JMP              @GOBLNK      ;JUMP, CONTINUOUS BLINKY
MODE SELECTED (PULSING MODE)
;
;
GOENVE: BCLR  BLINK                  ;DISABLE BLINK IN NORMAL MODE
        MOV.B @NOVRAM+181,R4L        ;NOVRAM+181,SCANNER FUNCTIONAL-
ITY FEATURES 2
        BTST  #7,R4L
        BEQ              CHKBRK       ;JUMP IF PROGRAM MODE ANYTIME

;
        BTST  ANYSCN
        BNE              NOTBRK
;
CHKBRK  BTST  BREAKN
        BEQ              NOTBRK       ;JUMP IF BREAK WAS NOT DETECTED
        JMP              @XSET        ;JUMP TO METROSET PROGRAMMING
MODE ROUTINE
;
NOTBRK:  MOV.B @NOVRAM+184,R4L       ;NOVRAM+184,BEEPER/TIMEOUT
OPERATING CHARACTERISTICS
        BTST  #7,R4L
```

FIG. 2A

```
                BEQ          NOBEL2     ;BRANCH IF BEEP ON REEL
NOT SELECTED
;
                BTST  BELL
                BEQ          NOBEL2     ;JUMP IF BEL COMMAND NOT
RECEIVED
                JSR          @BP_BEL
;
NOBEL2:   BTST  PROGRM
                BNE          VTANK      ;CHECK TRIGGER ONLY IN PROGRAM
MODE
;
                MOV.B @NOVRAM+183,R4L   ;NOVRAM+183
                AND          #H'F0,R4L
                CMP.B #H'10,R4L
                BEQ          VTANK      ;JUMP IF CONTINUOUS SCAN MODE
;
                MOV.B @NOVRAM+180,R4  ;NOVRAM+180, SCANNER FUNCTIONALITY
FEATURES 1
                BLD          #7,R4L     ;LOAD SCANNABILITY BIT INTO CARRY
                BOR          #6,R4L     ;OR WITH SCAN COUNT BIT
                BCC          NT_TEST    ;BRANCH IF NEITHER TEST MODE IS
SELECTED
                JMP          @POLL
;
;****  TURN THE LASER OFF, IF NOT OFF ALREADY
;
NT_TST:   BTST  LZSTAT
                BEQ          LASSET             ;BRANCH IF OFF
;
                JSR          @LASOF
                BCLR  LZSTAT
LASSET:   JSR          @WATCH
;
                MOV.B@NOVRAM+187,R4L   ;NOVRAM+187
                BILD  #1,R4L                    ;BIT 1 (OUT-OF-STAND STATUS INTO
CARRY)
;
                BTST  STAND                     ;READ STAND STATUS
                BNE          SLONG4     ;JUMP IF OUT OF THE STAND
;
;****  ALLOW LONG RANGE FOR 1 SEC ONLY IF IN THE STAND
;
                BTST  #5,R4L
                BNE          ISHORT     ;BRANCH IF ALREADY SHORT RANGE
;
                MOV.B @FIFTY,R4H
                CMP.B #D'3R4H
```

FIG. 2B

```
                BCS        ISHORT       ;BRANCH IF NOT 1 SEC
;
                BSET       #5,R4L
                MOV.B R4L,@NOVRAM+187 ;STORE SHORT RANGE IN SHADOW RAM
;
ISHORT:         BILD  #5,R4L            ;BIT 5 (IN-STAND STATUS INTO CARRY)
;**** SETUP THE IR RANGE DETECTOR
;
SLONG4:         BCLR  RANGE             ;ALWAYS BE LOW
                BST         RANGET      ;ENABLE/DISABLE INPUT TRANSISTOR
                MOV.B #H'C5:8,R4H       ;BITS 7,6,2,0 ARE OUTPUTS (P1.1, RANGE = INPUT)

BCC         SHORT3
                MOV.B #H'C7:8,R4H       ;BITS 7,6,2,1,0 ARE OUTPUTS (P1.1, RANGE = OUTPUT)
SHORT3:         MOV.B R4H,@P1DDR
;
 ***** DETERMINE YELLOW LED STATUS
                .AIF   "\&USEP60" EQ "TRUE"
                BTST  DASH20
                BNE         CK_POL      ;LEAVE LED ALONE WITH MS9520 UNIT
                .AENDI
;
                .AIF   "\&NEWYELLOW" EQ "TRUE"
                BILD  #7,R4L            ;BIT 7 (0 = USE BUTTON IN STAND)
                BTST  STAND
                BEQ         YEL_LW      ;BRANCH IF IN THE STAND
                BLD         #3,R4L
YEL_LW          BST         YELLED      ;YELLOW LED = ON IF NO BUTTON NEEDED
                .AENDI
;
CK_POL:         MOV.B @NOVRAM+161,R4L   ;NOVRAM+161
                BTST  #5,R4L
                BEQ         ISDTR       ;JUMP IF POLLING-MODE-D NOT SELECTED
;
                BLD         EOTIN
                BAND  ENQIN
                BAND  FSIN
                BCC         ISDTR
;
                MOV.B #EOTOUT,R4L
                JSR         @XMIT       ;RESPOND TO POLL WITH NO DATA INDICATOR
;
                BCLR  EOTIN
```

FIG. 2C

```
              BCLR    FSIN
;             BCLR    ENQIN
;****  CHECK FOR DTR ACTIVATION
;
ISDTR:  MOV.B  @NOVRAM+182,R4L       ;NOVRAM+182
              BTST    #0,R4L
              BEQ             DTROFF      ;JUMP IF NOT USING DTR
;
              BTST    DTR
              BNE             DTRDLY
              JMP             @ENVEI      ;JUMP IF DTR ACTIVE
;
DTRDLY:       MOV.B  #D'30:8,R3L
              JSR             @DLAYMS  ;DELAY FOR 15 MILLISECONDS
;
              BTST    DTR
              BNE             NOSCNO
              JMP             @ENVEI
;
NOSCNO:       MOV.B  #H'0:8,R4L
              MOV.B  R4L,@NOSCAN
              JMP             @POLL
;
;****  ACTIVATE THE IR AND CHECK FOR AN OBJECT
;
DTROFF:       BCLR    IRACT               ;ACTIVATE THE IR
;
              MOV.B  #D'15:8,R3L
;
              BLD             WEDGIN
              BAND  ALONE
              BCC             IROFF1
;
              JSR             @DLAYKB  ;DELAY FOR 7.5 MILLISECONDS

BRA             ISACT1
;
IROFFF:       JSR             @DLAYMS  ;DELAY FOR 7.5 MILLISECONDS
;
ISACT1:       BTST   PROX
              BEQ             PROXY
;
              MOV.B  #D'15:8,R3L
              BLD             WEDGIN
              BAND  ALONE
              BCC             IROFF2
;
              JSR             @DLAYKB  ;DELAY FOR 15 MILLISECONDS
```

FIG. 2D

```
                BRA         ISACT2
;
IROFF2:         JSR         @DLAYMS     ;DELAY FOR 15 MILLISECONDS
;
ISACT2:         BTST  PROX
                BEQ         PROXY
;
                MOV.B #H'0:8,R4L
                MOV.B R4L,@NOSCAN
                BRA         POLL
;
PROXY:          JMP         @ENVEI
;
;***** PROCEED WITH MAIN PROGRAM LOOP
;
POLL:           JSR         @LASOF
;
MLOOP:          MOV.W#STACK,R7          ;RE-INITIALIZE THE STACK
                JSR         @WATCH
;
THIS IS A SUBROUTINE USED TO SETUP THE PROGRAMMED RANGE VALUES:

;***** DETERMINE IR RANGE
;
SET_IR:MOV.B @NOVRAM+187,R4L            ;NOVRAM+187, DEPTHS OF FIELD
                BLD         XRANGE
                BST         #5,R4L      ;RESTORE NOVRAM IN-STAND STATUS BIT

MOV.B R4L,@NOVRAM+187   ;UPDATE THE SHADOW RAM
;
IR_SET:MOV.B @NOVRAM+187,R4L            ;NOVRAM+187, DEPTHS OF FIELD
                BILD  #5,R4L            ;BIT 5 (IN-STAND STATUS INTO CARRY)
;
                BTST  STAND             ;READ STAND STATUS
                BEQ         GET_IR      ;JUMP IF IN THE STAND
                BILD  #1,R4L            ;BIT 1 (OUT-OF-STAND STATUS INTO CARRY)
;
GET_IR:         BCLR  RANGE             ;ALWAYS BE LOW
                BST         RANGET      ;ENABLE/DISABLE INPUT TRANSISTOR
                MOV.B #H'C5:8,R4H       ;BITS 7,6,2,0 ARE OUTPUTS (P1.1, RANGE =
INPUT)
                BCC         SHORTX
                MOV.B #H'C7:8,R4H       ;BITS 7,6,2,0 ARE OUTPUTS (P1.1, RANGE =
OUTPUT)
SHORTX:         MOV.B R4H,@P1DDR
                RTS                     ;FROM SET_IR
```

FIG. 2E

AUTOMATIC RANGE ADJUSTMENT TECHNIQUES FOR STAND-MOUNTABLE BAR CODE SCANNERS

FIELD OF THE INVENTION

The invention relates generally to optical bar code scanners, and, more specifically, to stand-mountable bar code scanners that are equipped to operate in a longrange mode and a short range mode of object detection.

BACKGROUND ART

Many existing optical bar code scanners utilize an object detection mechanism to determine if an object is in proximity to the optically transmissive window of the scanner. Illustratively, this object detection mechanism may be implemented using an infrared light source and an infrared detector. If an object is detected, the scanner will activate a laser beam source of a bar code detection and decoding mechanism so as to attempt a reading of one or more bar codes on the object. If, during this process, a bar code is not detected and decoded, the scanner will deactivate the laser beam source and wait for another object to enter the field of view of the object detection mechanism. Unless the object detection mechanism detects the presence of another object, the laser beam source will remain deactivated, and, in this state, it will not be possible to read any bar codes. Once the object detection mechanism detects a new object, the process of attempting to read a bar code begins again. The scanner reactivates the laser beam source, thereby permitting one or more bar codes to be detected and decoded.

Problems arise if the scanner is mounted or remains in a position such that the object detection mechanism repeatedly detects the presence of a background object, over and over again, but at no time detects the absence of this object. In such situations, the scanner will fail to detect and decode bar codes. The object detection mechanism has deactivated the laser beam source in response to the background object. The laser beam source will not be reactivated unless the object detection mechanism determines that the background object has been removed.

The foregoing scenario will arise in operational environments where a bar code scanner is aimed at a counter top, or other background object, while mounted in a stand. Examples of background objects include counter surfaces, conveyer belts, stands, brackets, and various other surfaces in and around point-of-sale terminals. Some of these objects, such as counter tops, will remain stationary with respect to the bar code scanner, whereas other objects, such as conveyer belts, will not.

SUMMARY OF THE INVENTION

By automatically adjusting the object detection mechanism of a bar code scanner from a long range mode of operation to a short range mode of operation, the scanner will remain capable of detecting and decoding bar codes, even after the object detection mechanism has repeatedly detected the presence of a background object. The techniques of the present invention commence when the bar code scanner is placed in a position where the object detection mechanism has repeatedly detected a background object such as a counter top or conveyer belt. The object detection mechanism is set to the long range mode of operation if it is not already so set. In the case of a stand-mounted scanner, a test is performed to ascertain whether or not the scanner is in its stand, and the method will only proceed once the scanner is resting in the stand. Next, the scanner is programmed to wait for a predetermined amount of time, after which the operational mode of the object detection mechanism is changed from the long range mode to the short range mode. At this time, the object detection mechanism no longer detects the presence of the background object, The scanner will now detect any new objects that enter the field of view of the object detection mechanism, and attempt to read any bar codes which may be present.

The invention and its particular features and advantages will become more apparent from the following detailed description considered with reference to the accompanying drawings.

BRIEF DESCRIPTION OF THE DRAWINGS

FIGS. 2A through 2E together comprise a source code printout showing an illustrative machine-executable implementation for the method described in FIGS. 1A and 1B.

DETAILED DESCRIPTION,OF THE PREFERRED EMBODIMENTS

As stated above, the invention relates to stand-mountable bar code scanners that are equipped to operate in a long-range mode and a short range mode of object detection. Examples of such bar code scanners are disclosed in U.S. Pat. No. 5,340,971, issued on Aug. 23, 1994; U.S. Pat. No. 5,528,024, issued on Jun. 18, 1996; U.S. Pat. No. 5,525,789, issued on Jun. 11, 1996; U.S. Pat. No. 5,825,012 issued on Oct. 20, 1998; U.S. Pat. No. 5,886,337 issued on Mar. 23, 1999; U.S. Pat. No. 5,789,730, issued on Aug. 4, 1998; U.S. Pat. No. 5,837,989, issued on Nov. 17, 1998; and U.S. patent application Ser. No. 09/273,825 filed on Mar. 22, 1999. The disclosures of these issued U.S. Patents and patent application are incorporated by reference as if fully set forth herein.

Figure 1A:
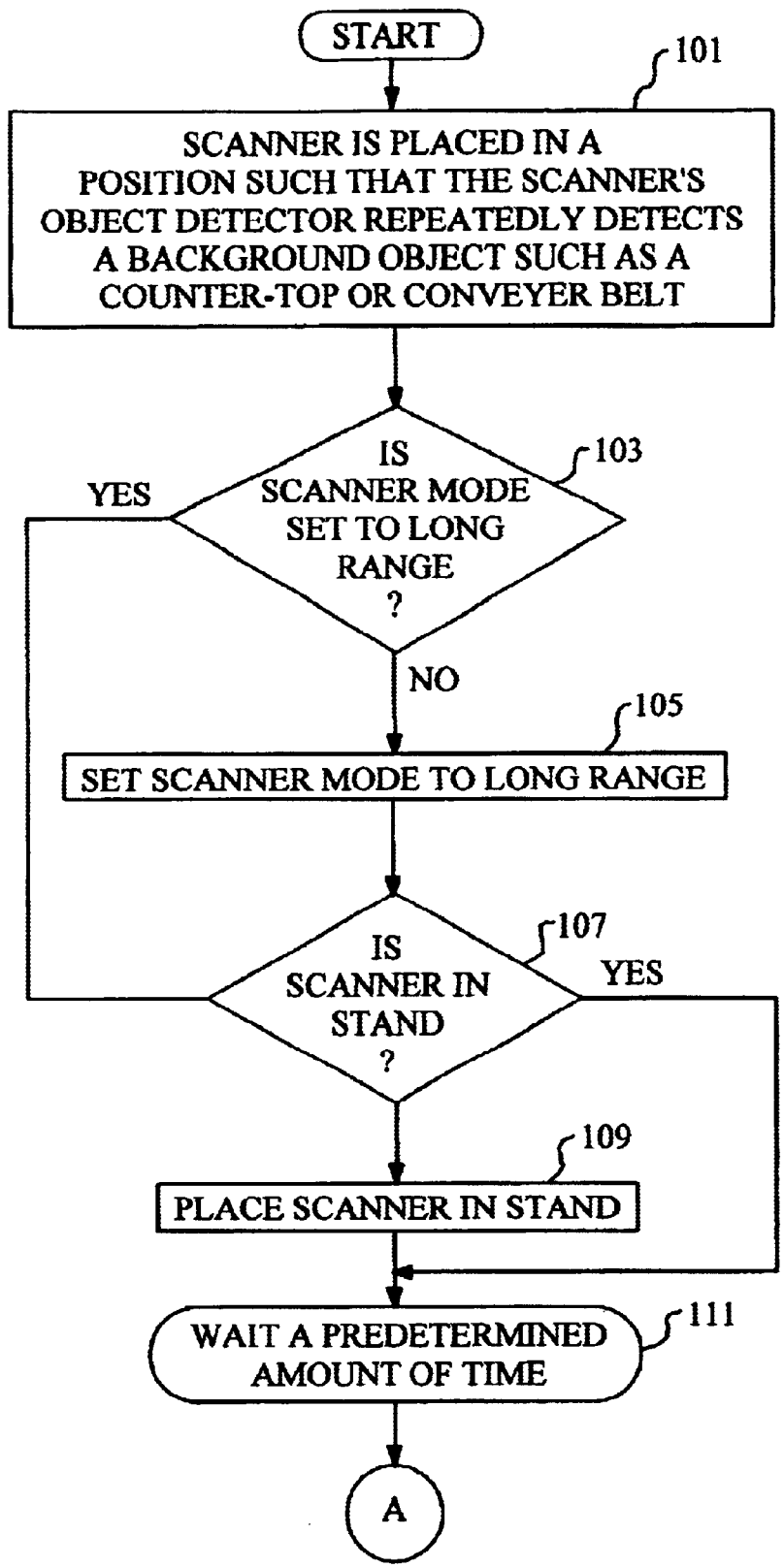
FIGS. 1A and 1B together comprise a flowchart setting forth an operational sequence, according to a preferred embodiment of the invention.
Figure 1B:
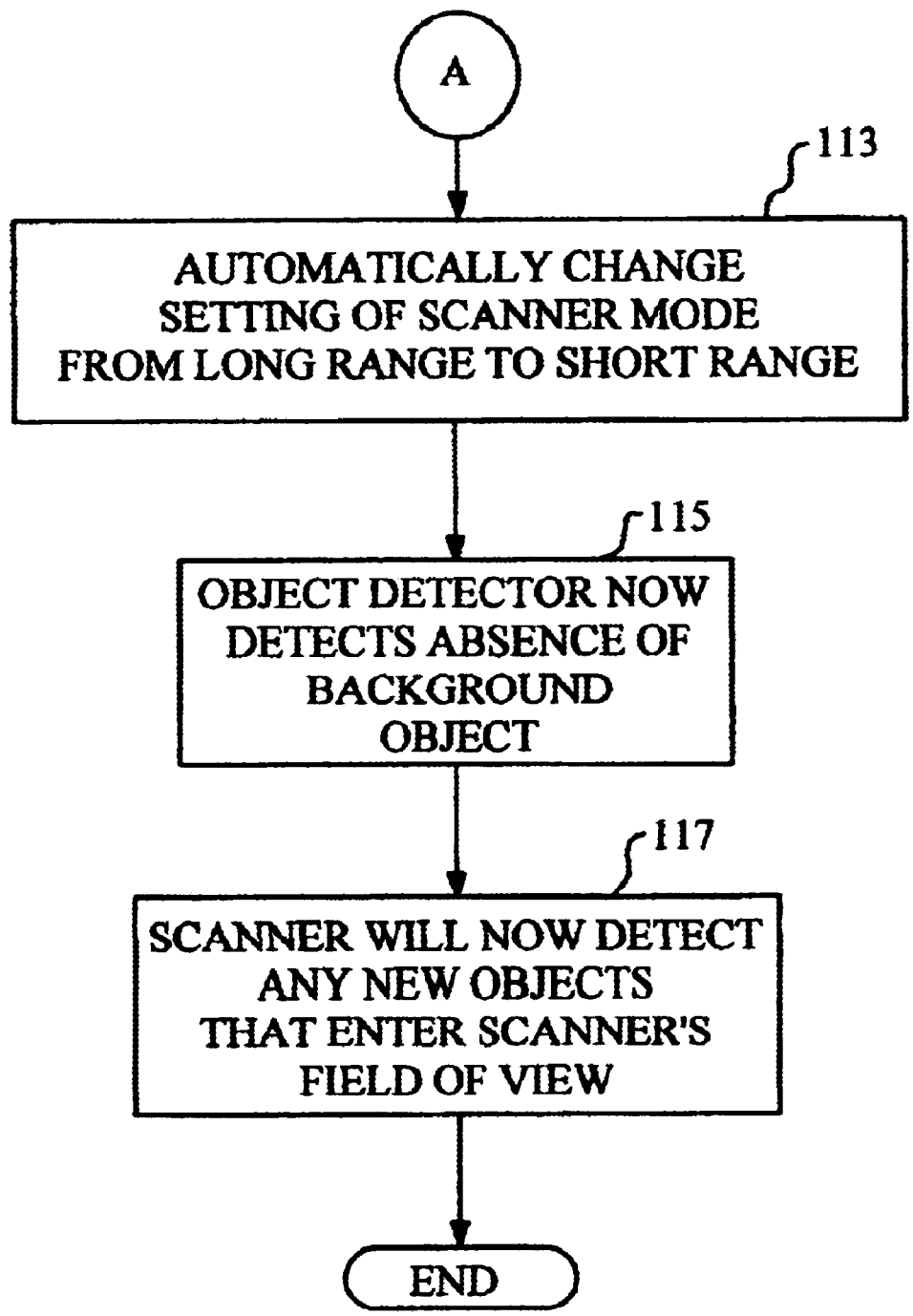

Refer now to FIGS. 1A and 1B, which together comprise a flowchart setting forth an operational sequence according to a preferred embodiment of the invention. The operational sequence commences at block 101, where a bar code scanner is placed in a position such that the scanner's object detector repeatedly detects a background object such as a countertop or a conveyer belt. This may occur, for example, if a bar code scanner is placed into its stand, and the positioning of the stand causes the bar code scanner to be aimed down at the countertop surface. Such a mounting configuration is commonplace at many point-of-sale terminals, so as to permit the scanner operator to quickly access and remove the bar code scanner from its stand during a sales transaction, and then reinsert the scanner into its stand after a scan has been performed. Unless the stand is positioned so as to aim the resting scanner upwards and away from the counter (which sometimes could result in the scanner being pointed at customers' eyes), most practical mounting configurations will result in the scanner being aimed at some type of background surface.

After the scanner is positioned as specified in block 101, a test is performed to ascertain whether or not the scanner's object detection mechanism is set to long range mode (block 103). This test maybe performed by means of software instructions that are executed by a processing mechanism within, and/or coupled to, the bar code scanner. If the scanner's object detection mechanism is already set to long-range mode, the program advances to block 107. However, if the scanner's object detection mechanism is not set to long-range mode, program control advances to block 105 where the scanner's object detection mode is set to long range. Then the program progresses to block 107.

At block 107, a test is performed to ascertain whether or not the scanner is placed in its stand. This step need only be performed for bar code scanners that are stand-mountable. However, the techniques of the present invention are also applicable to non-stand-mountable bar code scanners, in; which case, the test of block 107 need not be performed and the program will advance directly to block 111. For the moment, assume that the bar code scanner under consideration is, indeed, a stand-mountable scanner. If the test of block 107 determines that the scanner is not in its stand, the program waits until the scanner is placed in its stand (block 109). Illustratively, this test may be performed by equipping the stand and/or the scanner itself with a proximity switch or pressure sensor that automatically detects the presence or absence of the bar code scanner in its stand. Or, alternatively, instead of testing to see whether or not the scanner is in its stand, the, operations of block 107 could be configured to see whether or not the scanner is in a position such that it is repeatedly detecting a background object and never detecting the absence of this object. If the scanner has been placed into its stand (block 109), or, pursuant to the foregoing alternative, if the scanner is in a position such that it is repeatedly detecting a background object, the program advances to block 111.

At block 111, the program simply waits for a predetermined amount of time before proceeding further. One reason this is done is to avoid hysteresis effects where a user may be removing the scanner from its stand or getting ready to place the scanner back into its stand. If this waiting period were to be eliminated, the following step (block 113) might be performed at an inappropriate time, incorrectly placing the scanner into short-range mode when this is not desirable.

At block 113, after the waiting period has elapsed, the mode of the object detection mechanism is automatically changed from long range to short range. The object detector now detects the absence of the background object (block 115). Moreover, the scanner will now detect any new objects that enter the scanner's field of view.

FIGS. 2A through 2E are a source code printout showing an illustrative machine-executable implementation for the method described in FIGS. 1A and 1B. The instructions in bold type, starting at FIG. 2B, implement the operational sequence of blocks 10314 113 (FIGS. 1A and 1B). The source code listing will be performed by the processing mechanism of the bar code scanner at the time that an object is repeatedly detected by the object detection mechanism (i.e., the object has remained in the object detection field), and the scanner's processing mechanism is awaiting the removal of the object before it will read bar codes.

As a preliminary matter, the source code program of FIGS. 2A through 2E set up the object detection port. In this case, a source of infrared light is used to provide object detection, so the port is an IR detection port. Next, the program checks for command requests and enables deactivation of the scanner's motor. When activated, this motor rotates a polygon of light-reflective surfaces used to project bar code scanning lines into a scan field. This scan field is expected to include at least a portion of the detected object. The laser and LED operating modes are acquired, and the program takes any of various actions depending upon whether the scanner is in a "continuous blinky" (i.e., pulsed) mode.

On the second page of the source code (FIG. 2B), following the bold-type instruction NT_TST, the laser is deactivated if it is not already turned off. The program then determines whether or not the scanner is in its stand, as previously described with reference to FIG. 1, block 107. If the bar code scanner is in its stand, the program waits for a predetermined amount of time (FIG. 1, block 113). In the example of FIG. 2, this predetermined amount of time is one second, although any of various other time delays could be used, from about zero seconds on up to about twenty seconds, depending upon the specific system application in question. During this time delay, the object detection mechanism of the bar code scanner remains in the long range mode. The object detection mechanism (referred to in FIG. 2 as the "IR range detector" is set up in the short-range mode by specifying this mode in a shadow RAM (random-access memory) device associated with the scanner's processing mechanism.

After the line labelled "SHORT3:", the program determines the status of an indication LED on the bar code scanner. Next, after the line labelled "DTROFF:" and including the instruction "BCLR IRACT", the infrared object detection mechanism is activated and the scanner checks for the presence of an object. The last page of the source code listing sets forth a subroutine for setting up preprogrammed long-range and short-range values for the object detection mechanism of the bar code scanner. These values are programmed into the previously-mentioned shadow RAM.

While the preferred embodiments of the present invention have been described in detail, it will be appreciated that numerous variations and modifications of the present invention will occur to persons skilled in the art. All such variations and modifications shall constitute the present invention as defined by the scope and spirit of the appended claims. Although the invention has been described above with reference to particular arrangements of features, techniques, programming instructions, and the like, these are not intended to exhaust all possible arrangements, and many other modifications and variations will be ascertainable to those of skill in the art.

What is claimed is:

1. A method for use with a bar code scanner having: (i) an object detection mechanism equipped to perform a long range mode of object detection and a short range mode of object detection, and (ii) a scanning mechanism equipped to generate and control a scanning beam, the method comprising the steps of:

(a) the object detection mechanism repeatedly detecting presence of a background object; and
   (b) automatically placing the object detection mechanism in the short range mode of operation;
      wherein the short range mode of operation specifies a first range upon which detecting presence of a background object will activate the scanning mechanism,
      wherein the scanner will detect presence of new objects while the background object is still present, and
      wherein the long range mode of operation specifies a second range upon which detecting presence of,a background object will activate the scanning mechanism, such that the second range is greater than the first range.

2. The method of claim 1 further including the step of introducing a predetermined time delay prior to the performance of step (b).

3. The method of claim 2 wherein the predetermined time delay is greater than 0 seconds but less than twenty seconds.

4. The method of claim 3 wherein the predetermined time delay is less than one second.

5. The method of claim 1 wherein the background object is a countertop.

6. The method of claim 1 wherein the background object is a conveyor belt.

7. The method of claim 1 wherein the bar code scanner is adapted for repeated insertion into, and removal from, a stand.

8. A method for use with a stand-mountable bar code scanner having a scanning mechanism equipped to produce and control a scanning beam, a processing mechanism and an object detection mechanism equipped to perform a long range mode of object detection and a short range mode of object detection, the method comprising the steps of:

(a) the object detection mechanism repeatedly detecting a background object;

(b) setting the object detection mechanism to the long range mode of operation if the object detection mechanism is not already so set;

(c) the processing mechanism performing a test to ascertain whether or not the scanner is in the stand;

(d) once the scanner is in the stand, the processing mechanism waiting for a predetermined amount of time, after which the processing mechanism changes the mode of the object detection mechanism from the long range mode to the short range mode, wherein the short range mode of operation specifies a first range upon which detecting presence of a background object will activate the scanning beam and the scanning mechanism, and wherein the long range mode of operation specifies a second range upon which detecting presence of a background object will activate the scanning mechanism, such that the second range is greater than the first range.

9. The method of claim 8 further comprising the step of the object detection mechanism no longer detecting the presence of the background object.

10. The method of claim 9 wherein the scanner will now detect any new objects that enter the field of view of the object detection mechanism, and attempt to read any bar codes which may be present.

11. The method of claim 8 wherein the background object is a countertop.

12. The method of claim 8 wherein the background object is a conveyor belt.

* * * * *